US008565759B1

(12) United States Patent
Oroskar

(10) Patent No.: US 8,565,759 B1
(45) Date of Patent: Oct. 22, 2013

(54) SELECTIVE SIMULTANEOUS COMMUNICATION WITH A WIRELESS COMMUNICATION DEVICE BASED ON LIKELIHOOD OF ROAMING

(75) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 261 days.

(21) Appl. No.: 13/100,756

(22) Filed: May 4, 2011

(51) Int. Cl.
*H04W 4/00* (2009.01)

(52) U.S. Cl.
USPC ........................................ 455/432.1

(58) Field of Classification Search
USPC ............................... 455/432.1–445
See application file for complete search history.

(56) References Cited

U.S. PATENT DOCUMENTS

| 5,369,681 | A | 11/1994 | Boudreau et al. |
| 5,978,463 | A | 11/1999 | Jurkevics et al. |
| 6,069,871 | A | 5/2000 | Sharma et al. |
| 6,181,945 | B1 | 1/2001 | Lee |
| 6,223,042 | B1 | 4/2001 | Raffel |
| 6,243,590 | B1 | 6/2001 | Reddy et al. |
| 6,556,831 | B1 | 4/2003 | Buppelmann |
| 6,643,520 | B1 | 11/2003 | Park et al. |
| 6,745,039 | B1 | 6/2004 | Di Lalla |
| 6,922,561 | B2 | 7/2005 | Chen et al. |
| 6,963,750 | B1 | 11/2005 | Cheng et al. |
| 7,065,361 | B1 | 6/2006 | Fortuna |
| 7,177,658 | B2 | 2/2007 | Willenegger et al. |
| 7,260,415 | B1 | 8/2007 | Oh |
| 7,349,699 | B1 | 3/2008 | Kelly et al. |
| 7,366,526 | B2 | 4/2008 | Zhang et al. |
| 2004/0037264 | A1 | 2/2004 | Khawand |
| 2004/0097230 | A1* | 5/2004 | Natarajan et al. ............. 455/436 |
| 2004/0125768 | A1 | 7/2004 | Yoon et al. |
| 2004/0192306 | A1* | 9/2004 | Elkarat et al. .............. 455/435.2 |
| 2006/0058056 | A1 | 3/2006 | Das et al. |
| 2006/0094423 | A1 | 5/2006 | Sharma et al. |
| 2006/0116125 | A1 | 6/2006 | Buckley et al. |
| 2006/0142032 | A1 | 6/2006 | Derakshan et al. |
| 2006/0142051 | A1 | 6/2006 | Purnadi et al. |
| 2006/0160551 | A1 | 7/2006 | Matoba et al. |
| 2006/0274685 | A1 | 12/2006 | Johnson et al. |
| 2007/0053336 | A1 | 3/2007 | Petrovic et al. |
| 2007/0105535 | A1 | 5/2007 | Jacobson et al. |

(Continued)

FOREIGN PATENT DOCUMENTS

EP 2 244 502 10/2010

OTHER PUBLICATIONS

Office Action for U.S. Appl. No. 13/044,794 mailed Jul. 18, 2012, 22 pages.

(Continued)

*Primary Examiner* — Steven Lim

(57) ABSTRACT

In situations in which a wireless communication device (WCD) is likely to roam, a radio access network (RAN) serving the WCD may increase the extent of simultaneous communication between the RAN and the WCD. In this way, the WCD is more likely to receive sufficiently strong signals from at least one wireless coverage area with which the WCD is communicating, potentially resulting in a decrease of the likelihood that the WCD roams. A determination that the WCD is likely to roam may be based on, for example, historical roaming data that was collected during the WCD's previous session(s) with the RAN or other RANs.

20 Claims, 9 Drawing Sheets

(56) References Cited

U.S. PATENT DOCUMENTS

| | | |
|---|---|---|
| 2007/0173252 A1 | 7/2007 | Jiang |
| 2008/0025235 A1 | 1/2008 | Mahany et al. |
| 2008/0032713 A1 | 2/2008 | Yang |
| 2008/0081623 A1 | 4/2008 | Burgan et al. |
| 2008/0096520 A1 | 4/2008 | Benco et al. |
| 2008/0293419 A1 | 11/2008 | Somasundaram et al. |
| 2008/0293437 A1 | 11/2008 | Ranganathan et al. |
| 2009/0016328 A1 | 1/2009 | Peisa et al. |
| 2009/0061854 A1 | 3/2009 | Gillot et al. |
| 2009/0247137 A1 | 10/2009 | Awad |
| 2009/0285113 A1 | 11/2009 | Yavuz et al. |
| 2010/0120437 A1 | 5/2010 | Foster et al. |
| 2010/0268674 A1 | 10/2010 | Dwyer et al. |
| 2010/0311420 A1 | 12/2010 | Reza et al. |
| 2011/0021197 A1 | 1/2011 | Ngai |
| 2011/0034167 A1 | 2/2011 | Ben-Shaul et al. |

OTHER PUBLICATIONS

Oroskar et al., U.S. Appl. No. 12/853,730, filed Aug. 10, 2010, 48 pages.

Vargantwar et al., U.S. Appl. No. 12/815,700, filed Jun. 15, 2010, 41 pages.

Vargantwar et al., U.S. Appl. No. 12/815,709, filed Jun. 15, 2010, 42 pages.

Vargantwar et al., U.S. Appl. No. 12/847,198, filed Jul. 30, 2010, 36 pages.

Oroskar, Siddharth S., U.S. Appl. No. 12/909,165, filed Oct. 21, 2010, 35 pages.

Oroskar et al., U.S. Appl. No. 13/044,794, filed Mar. 10, 2011, 51 pages.

Oroskar et al., U.S. Appl. No. 12/854,114, filed Aug. 10, 2010, 48 pages.

Office Action for U.S. Appl. No. 12/853,730 dated Jan. 18, 2012, 13 pages.

Office Action for U.S. Appl. No. 12/815,700 dated Dec. 14, 2011, 9 pages.

Office Action for U.S. Appl. No. 12/815,709 dated Feb. 21, 2012, 5 pages.

TIA Standard, "Interoperability Test Specification for cdma2000® Air Interface," TIA-1036, Section 3.11, Jan. 2005.

TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001.

3rd Generation Partnership Project 2 "3GPP2", "Source-Controlled Variable-Rate Multimode Wideband Speech Codec (VMR-WB), Service Options 62 and 63 for Spread Spectrum Systems," 3GPP2 C.50052-A, Version 1.0, Apr. 22, 2005.

L. Cai et al., "Mitigating DoS Attacks on the Paging Channel by Efficient Encoding in Page Messages," In: Proceedings of 5th International ICST Conference on Security and Privacy in Communication Networks (SecureComm 2009), Sep. 2009.

U.S. Appl. No. 11/535,870, filed Sep. 27, 2006.

Office Action from U.S. Appl. No. 11/535,870, dated Apr. 3, 2009.

Office Action from U.S. Appl. No. 11/535,870, dated Nov. 12, 2009.

Office Action from U.S. Appl. No. 11/535,870, dated Feb. 18, 2010.

U.S. Appl. No. 12/261,229, filed Oct. 30, 2008.

U.S. Appl. No. 12/553,661, filed Sep. 3, 2009.

U.S. Appl. No. 12/558,359, filed Sep. 11, 2009.

U.S. Appl. No. 12/572,829, filed Oct. 2, 2009.

U.S. Appl. No. 12/690,629, filed Jan. 20, 2010.

U.S. Appl. No. 12/756,027, filed Apr. 7, 2010.

U.S. Appl. No. 12/776,287, filed May 7, 2010.

U.S. Appl. No. 12/786,174, filed May 24, 2010.

U.S. Appl. No. 12/786,184, filed May 24, 2010.

U.S. Appl. No. 12/854,119, filed Aug. 10, 2010.

Hasswa et al., "Generic Vertical Handoff Decision Function for Heterogeneous Wireless Networks," IFIP Int. Conf. Wireless and Optical Communications Network (WOCN), pp. 239-243 (Mar. 6, 2005).

NTT DoCoMo et al., "IDLE Mode Mobility Control Principles," 3GPP TSG RAN WG2 #59BIS; 3GPP Draft; R2-074001, 8 pages, Oct. 8-12, 2007.

NTT DoCoMo et al., "Load Balancing Solutions for LTE," 3GPP TSG RAN WG2 #58bis; 3GPP Draft; R2-072719, 5 pages, Jun. 22, 2007.

International Search Report and Written Report for PCT/US2012/028070 mailed May 7, 2012, 15 pages.

\* cited by examiner

| WCD IDENTIFIER | RECENT VISITS (CALLS) | RECENT VISITS (CALLS) RESULTING IN HANDOFF | PERCENTAGE |
|---|---|---|---|
| 312-555-1000 | 5 | 0 | 0% |
| 312-555-1001 | 14 | 7 | 50% |
| 312-555-1002 | 80 | 8 | 10% |
| 312-555-1003 | 3 | 3 | 100% |

SELECTIVE SIMULTANEOUS COMMUNICATION WITH A WIRELESS COMMUNICATION DEVICE BASED ON LIKELIHOOD OF ROAMING

BACKGROUND

Some types of wireless network technologies, such as Code Division Multiple Access (CDMA) technologies, allow a wireless communication device (WCD) to communicate with a radio access network (RAN) substantially simultaneously via multiple wireless coverage areas. This substantially simultaneous communication may occur either during call establishment or after a call has been established.

During call establishment, the RAN may transmit more than one channel assignment message to the WCD. Each of these channel assignment messages may be transmitted via a different wireless coverage area. In this way, the probability that the WCD receives at least one channel assignment message is increased.

Once a call has been established, the RAN may transmit copies of the same bearer data to the WCD via traffic channels from each of several wireless coverage areas. This approach can increase the likelihood that the WCD will receive at least one copy of the bearer data. Additionally, the WCD may be able to combine two or more received copies of the bearer data such that the WCD can decode the received bearer data more reliably than if the WCD received only one copy of the bearer data. An analogous procedure may be used for bearer data transmitted by the WCD.

OVERVIEW

By engaging in substantially simultaneous communication with WCDs, a RAN may be able to provide better wireless service to WCDs that are likely to roam. Roaming may occur when a WCD's wireless service provider (the "home" wireless service provider to which the WCD is subscribed) cannot supply a reasonable wireless coverage to the WCD, and the WCD is instead served by one of the home wireless service provider's roaming partners. Consequently, the roaming partner supplies wireless service for the WCD for a period of time, typically until the home wireless service provider can once again supply a reasonable wireless coverage to the WCD.

While roaming agreements may result in a better overall wireless coverage for WCDs, and therefore a better experience for WCD users, there are drawbacks to letting a WCD roam. One such drawback is that, while roaming, the WCD may not have access to applications and services offered by the home wireless service provider. Another drawback to roaming is that the roaming partner may charge the home wireless service provider a fee for each unit of time, unit of data, or transaction that the roaming partner serves a roaming WCD. Other drawbacks may exist as well.

Therefore, in situations in which the WCD is likely to roam, it may be advantageous for the home wireless service provider's RAN to increase the extent of substantially simultaneous communication with the WCD. In this way, the WCD is more likely to receive sufficiently strong signals from at least one wireless coverage area with which the WCD is communicating. As a result, the likelihood that the WCD roams may decrease.

Accordingly, in a first example embodiment, a RAN may radiate to define a first preferred wireless coverage area and a second preferred wireless coverage area. Preferred wireless coverage areas may be owned or operated by the home wireless service provider. Further, the RAN may currently serve the WCD via the first preferred wireless coverage area. The RAN may determine that roaming data indicates that a WCD is likely to begin roaming to a non-preferred wireless coverage area. In at least some embodiments, non-preferred wireless coverage areas are owned or operated by a roaming partner of the home wireless service provider. Then, based on at least the roaming data indicating that the WCD is likely to begin roaming, the RAN may select the second preferred wireless coverage area, and communicate with the WCD substantially simultaneously via the first and second preferred wireless coverage areas.

However, a potential downside of a WCD and a RAN engaging in substantially simultaneous communication is that the communication requires use of more wireless air interface resources than non-simultaneous communication. For example, if the RAN substantially simultaneously transmits multiple channel assignment messages to the WCD, each via a different wireless coverage area, control channel resources of each of these wireless coverage areas are used. Similarly, if the RAN substantially simultaneously transmits copies of the same bearer data to the WCD, each copy via a traffic channel from a different wireless coverage area, traffic channel resources in each of these wireless coverage areas are used. Thus, excessive use of substantially simultaneous communication may have a deleterious impact on the resource utilization of the RAN. Therefore, it behooves the RAN to be able to determine when a WCD is unlikely to benefit from substantially simultaneous communication, and in response to this determination, reduce the degree of substantially simultaneous communication between the RAN and this WCD.

Thus, while serving the WCD via the first and second preferred wireless coverage areas, the RAN may determine that roaming data indicates that the WCD is no longer likely to begin roaming to the non-preferred wireless coverage area. Based on at least the roaming data indicating that the WCD is no longer likely to begin roaming, the RAN may begin communicating with the WCD via exactly one of the first and second preferred wireless coverage areas.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Network Architecture

Figure 1:
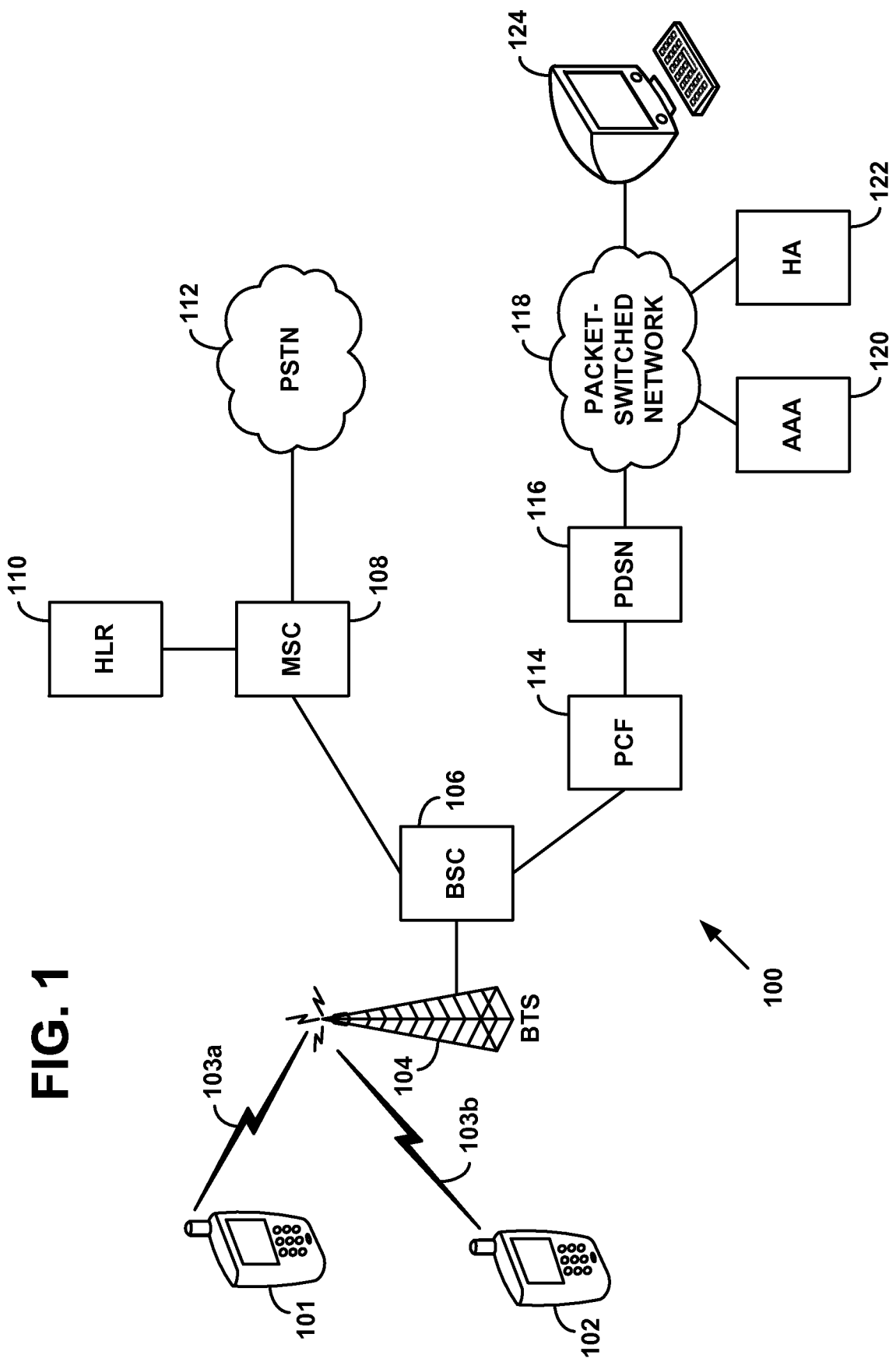
FIG. 1 depicts a RAN, in accordance with an example embodiment.

FIG. 1 is a simplified block diagram of a wireless communication system 100 in which example embodiments can be employed. WCD 101 may communicate over an air interface 103a with a base transceiver station (BTS) 104, which is, in turn, coupled to or integrated with a base station controller (BSC) 106. Similarly, WCD 102 may communicate over an air interface 103b with BTS 104. Transmissions over air interface 103a from BTS 104 to WCD 101 and over air interface 103b from BTS 104 to WCD 102 may represent "forward links" to the WCDs. Conversely, transmissions over air interface 103a from WCD 101 to BTS 104 and over air interface 103b from WCD 102 to BTS 104 may represent "reverse links" from the WCDs.

BSC 106 may be connected to a mobile switching center (MSC) 108. BSC 106, MSC 108, or both, may act to control assignment of air interface traffic channels, and may provide access to wireless circuit-switched services such as circuit-voice and circuit-data services. As represented by its connection to public-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a Mobile Internet Protocol (mobile-IP) home agent (HA) 122, and a remote computer 124.

After acquiring a traffic channel over air interface 103a, WCD 101 may transmit a request to PDSN 116 for a connection to the packet data network. Then, following authentication of WCD 101 by AAA server 120, WCD 101 may be assigned an IP address by the PDSN or by HA 122, and may thereafter engage in packet-data communications with entities such as remote computer 124. Similar procedures may take place for WCD 102, via air interface 103b.

Figure 2A:
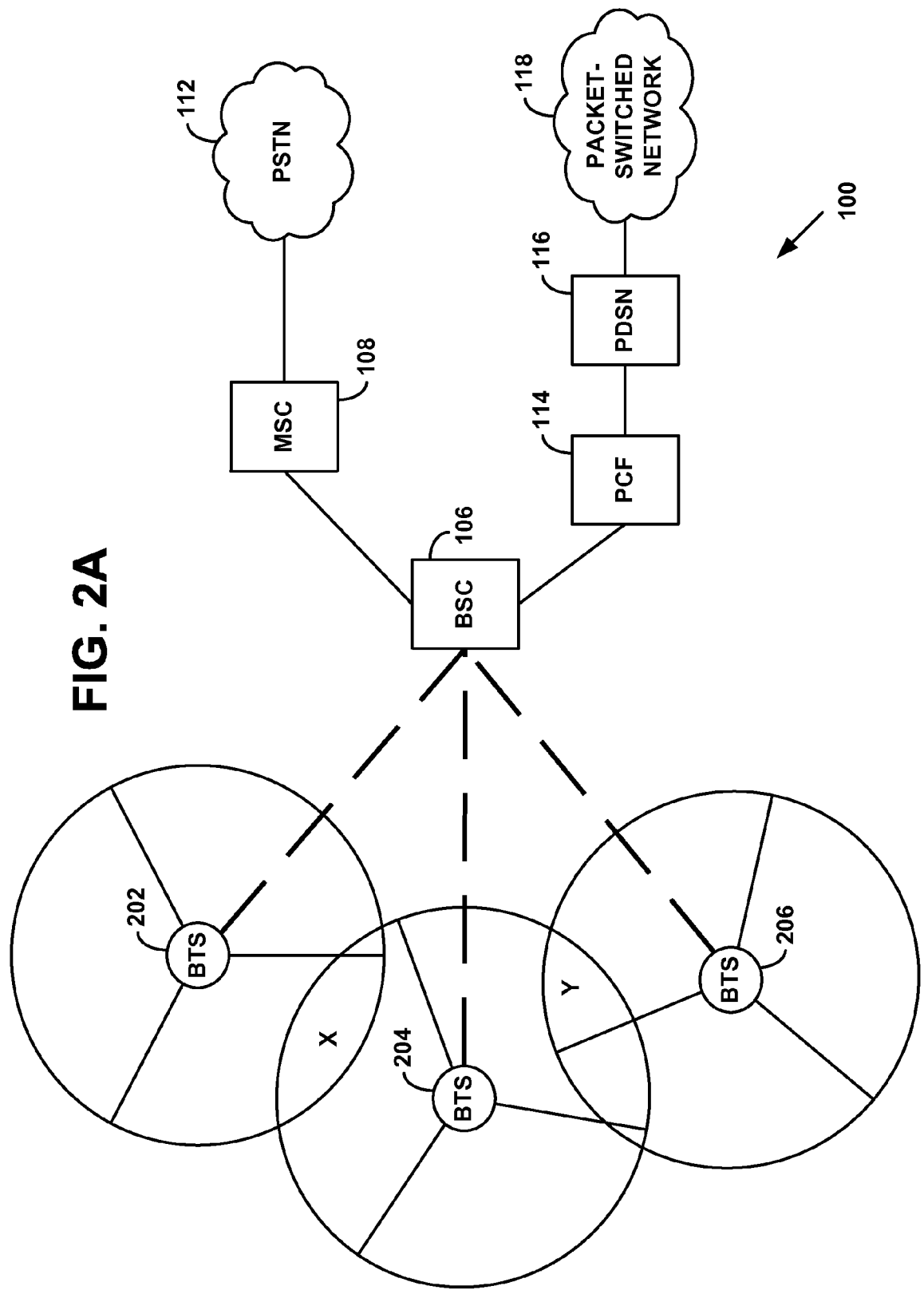
FIG. 2A depicts a RAN with several wireless coverage areas, in accordance with an example embodiment.

In practice, a BSC may serve multiple BTSs, each of which may define one or more wireless coverage areas. An example of such an arrangement is illustrated in FIG. 2A, which shows BSC 106 in wireless communication system 100 coupled with BTSs 202, 204, and 206. Each BTS is shown at the core of a respective circle representing wireless coverage, with each circle divided into three pie-shaped pieces representing individual wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas per BTS in FIG. 2A is intended to be for purposes of example, and other numbers of wireless coverage areas per BTS are possible. Further, the relative positions of the BTSs and the relative angular orientations of the wireless coverage areas are also illustrative, and other arrangements may be used. Moreover, a BTS's overall wireless coverage may not be circular, and may take on other shapes and arrangements instead.

A WCD may receive the same bearer data simultaneously from more than one wireless coverage area. Herein the term "bearer data" inclusively refers to any form of circuit-switched or packet-switched voice, video, audio, text, graphics, or other type of information. However, in at least some embodiments, "bearer data" excludes information transmitted on signaling channels. To illustrate how simultaneous reception of bearer data may occur, FIG. 2A includes points X and Y. While in the vicinity of point X, a WCD may be able to receive signals from wireless coverage areas of BTS 202 and BTS 204. Similarly, while in the vicinity of point Y, a WCD may be able to receive signals from wireless coverage areas of BTS 204 and BTS 206. It should be noted that, in practice, a WCD located at or near points X or Y may be able to receive signals (and therefore simultaneously receive the same bearer data) from more than two wireless coverage areas.

Figure 2B:
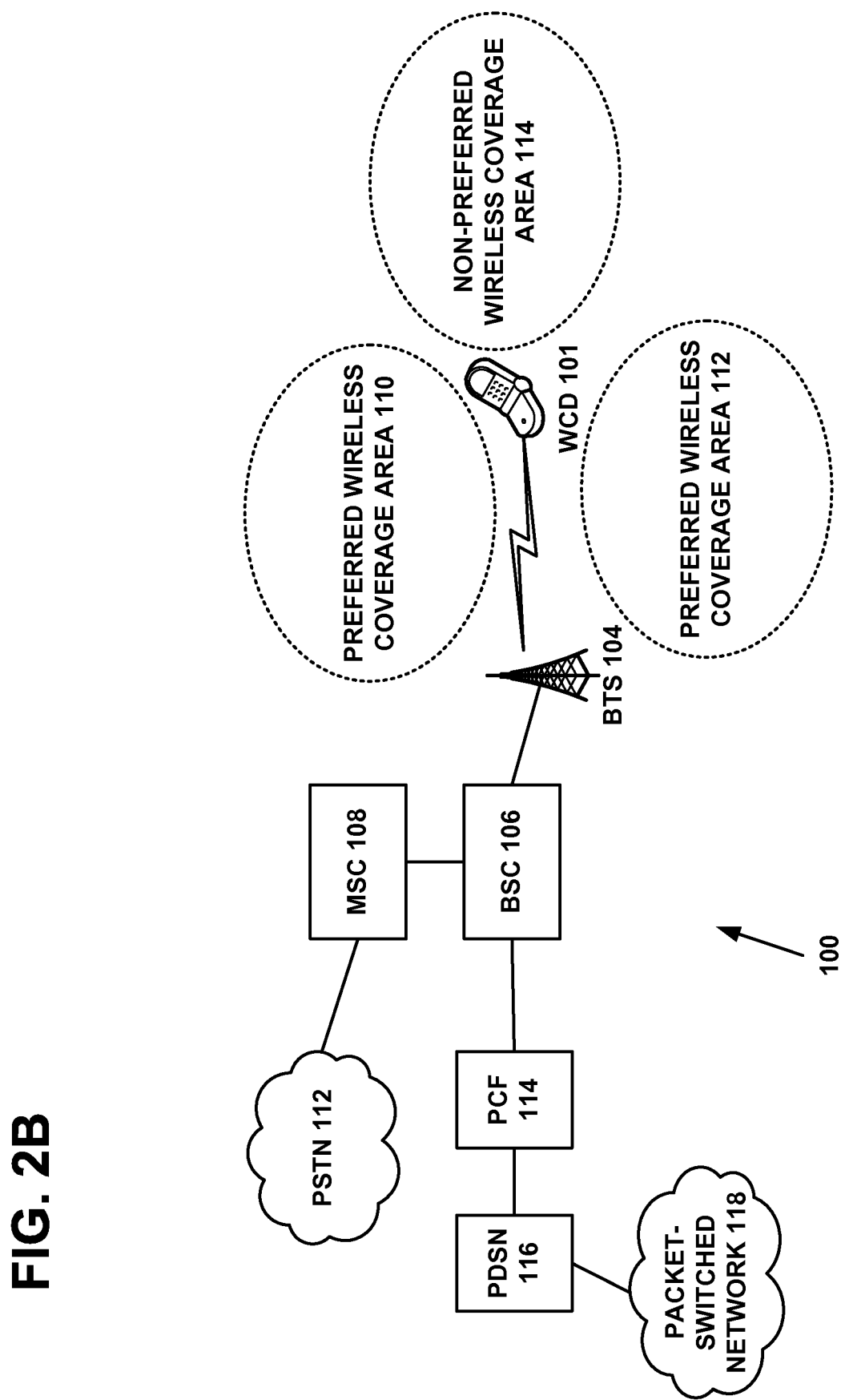
FIG. 2B depicts a WCD within range of preferred and non-preferred wireless coverage area, in accordance with an example embodiment.

As a further example of a RAN configuration, FIG. 2B shows another view of wireless communication system 100. In this view, BTS 104 may radiate to define preferred wireless coverage areas 110 and 112. Alternatively, BTS 104 may define only one of these preferred wireless coverage areas, and a different BTS from wireless communication system 100 may define the other preferred wireless coverage area. The home wireless service provider (e.g., the entity that owns and/or operates wireless communication system 100) may categorize wireless coverage areas that the home wireless service provider operates and/or controls as "preferred," while categorizing wireless coverage areas that the home wireless service provider's roaming partners operate and/or control as "non-preferred." Thus, non-preferred wireless coverage area 114 may be defined by a roaming partner's RAN, and WCD 101 may be considered to be roaming if WCD 101 communicates via non-preferred wireless coverage area 114.

Although three wireless coverage areas are shown in FIG. 2B, the embodiments herein may make use of more or fewer wireless coverage areas. For example, BTS 104 may radiate to define more than two preferred wireless coverage areas. Similarly, there may be more than one non-preferred wireless coverage area within range of WCD 101. While FIG. 2B depicts the physical coverage of preferred wireless coverage area 110, preferred wireless coverage area 112, and non-preferred wireless coverage area 114 as being mutually exclusive, in reality, the physical coverage of two or more of these wireless coverage areas may overlap with one another. Thus, for instance, preferred wireless coverage area 110 may fully overlap or not overlap at all with one or more of preferred wireless coverage area 112 and non-preferred wireless coverage area 114.

In general, the depictions of FIGS. 1, 2A, and 2B are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangements shown in FIGS. 1, 2A, and 2B should not be viewed as limiting with respect to the present embodiments. For instance, BSC 106 may be replaced by one or more radio network controllers (RNCs), and MSC 108 may be replaced, in whole or in part, by one or more softswitch and/or media gateway components.

Figure 3:
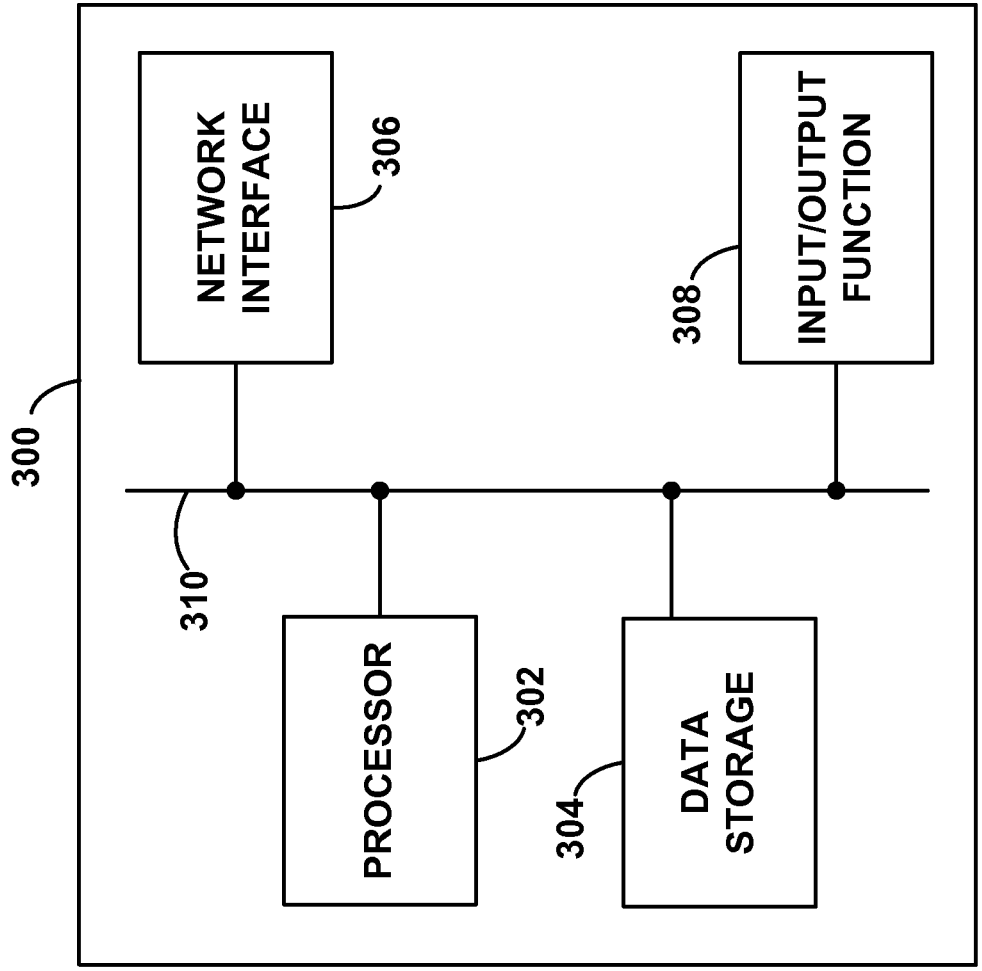
FIG. 3 is a block diagram of a RAN component, in accordance with an example embodiment.

FIG. 3 is a simplified block diagram exemplifying a RAN component 300, illustrating one or more of the functional elements that may be found in a RAN arranged to operate in accordance with the embodiments herein. RAN component 300 could be any type of device found in or associated with a RAN, such as a BTS, a BSC, or an MSC. For purposes of illustration, this specification may equate RAN component 300 to a BSC from time to time. Nonetheless, it should be understood that the description of RAN component 300 could apply to any component used for the purposes described herein.

RAN component 300 may include a processor 302, a data storage 304, a network interface 306, and an input/output function 308, all of which may be coupled by a system bus 310 or a similar mechanism. Processor 302 may include one or more CPUs, such as one or more general purpose processors and/or one or more dedicated processors (e.g., application specific integrated circuits (ASICs) or digital signal processors (DSPs), etc.)

Data storage 304, in turn, may comprise volatile and/or non-volatile data storage and can be integrated in whole or in part with processor 302. Data storage 304 may store program instructions, executable by processor 302, and data that is manipulated by these instructions to carry out the various methods, processes, or functions described herein. Alternatively, these methods, processes, or functions can be defined by hardware, firmware, and/or any combination of hardware, firmware and software. Therefore, data storage 304 may be a non-transitory computer-readable medium, having stored thereon program instructions that, if executed by one or more processors, cause RAN component 300 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical communication interfaces.

Input/output function 308 may facilitate user interaction with example RAN component 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN component 300 may support remote access from another device, via network interface 306 or via another interface (not shown), such an RS-232 or Universal Serial Bus (USB) port.

II. CDMA Communications

The present invention will be described by way of example with reference to Code Division Multiple Access (CDMA) communications. However, it should be understood that the invention can apply to other families of protocols now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be assigned dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be assigned dynamically to WCDs for use as traffic channels.

a. Soft Handoff

During a call, a WCD may communicate substantially simultaneously via a number of "active" wireless coverage areas at a time. Herein, the term "substantially simultaneously" may be used to describe communications involving two or more discrete messages that pass through two or more different intermediate points at approximately the same time, such as within a few tens of milliseconds or less.

Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set."

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion.)

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but are in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

To facilitate a determination of which wireless coverage areas should be in the WCD's active and candidate sets, each BTS may emit a pilot channel signal per each wireless coverage area the respective BTS defines. The WCD may constantly, or from time to time, measure the strength of each pilot channel signal that it receives and may notify the RAN when a received pilot strength is above or below designated thresholds.

More particularly, the BTS may provide the WCD with a handoff direction message (HDM), which indicates (i) the PN offsets of the wireless coverage areas in the WCD's active set, and (ii) the following handoff parameters that relate to pilot signal strength:

T_ADD: Threshold pilot strength for addition to the active set (e.g., −14 decibels (dB))

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The WCD may then monitor the pilot signals that it receives, measuring signal strength for each as $E_c/I_c$, where $E_c$ is energy per CDMA chip for the pilot signal of a given wireless coverage area and $I_c$ is the total power received. Values of $E_c/I_c$ may range from 0 dB (very good signal strength) to −16 dB (very poor signal strength). It should be understood that $E_c/I_c$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a pilot strength measurement message (PSMM) to the BSC with information indicative of the identity of the wireless coverage area. If the pilot strength exceeds any active wireless coverage area signal by T_COMP, the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set is a soft handoff.

If the WCD detects that the signal strength of a pilot channel in its active set drops below T_DROP, the WCD starts a handoff drop timer. If T_TDROP passes without this signal strength exceeding T_DROP, the WCD may then transmit a PSMM to the BSC, indicating the wireless coverage area and the detected $E_c/I_c$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating (e.g., transmitting and/or receiving bearer data), the WCD may be receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

b. Idle Handoff and Call Establishment

It is potentially beneficial for a RAN to facilitate rapid and reliable assignment of traffic channels to a WCD, so that the WCD's communications commence quickly and reliably and do not suffer from unnecessary latency or loss during handoffs. At least two techniques can be used improve channel assignment. The first involves the RAN substantially simultaneously transmitting channel assignment messages to the WCD via multiple wireless coverage areas. The second involves the RAN assigning the WCD traffic channels from multiple wireless coverage areas in a single channel assignment message. For the latter technique, the RAN would then be able to substantially simultaneously communicate bearer data with the WCD via multiple wireless coverage areas. These techniques may be used individually or combined with one another.

Regardless, in order to appreciate these techniques, it is helpful to consider how the RAN communicates with a WCD that is idle (i.e., not exchanging bearer data with the RAN). An idle WCD may register with a primary wireless coverage area, and listen to the paging channel of the primary wireless coverage area for incoming call indications, and other information, from the RAN. The RAN may transmit system parameter messages and/or neighbor list update messages to the WCD via this primary paging channel. These messages may contain PN offsets of the pilot channels emitted by BTSs that define neighboring wireless coverage areas (e.g., wireless coverage areas defined by the RAN's BTSs or wireless coverage areas defined by nearby BTSs in different RANs). Similar to an active WCD, an idle WCD may measure the pilot channel signal strength that it receives from each of these neighboring wireless coverage areas.

If, for some period of time, the WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and register with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer data to the RAN on a reverse traffic channel by applying the WCD's assigned PN long code offset to a PN long code. The WCD may then modulate the bearer data according to the resulting point in the PN long code.

c. Substantially Simultaneous Transmission of Control Traffic

Figure 4:
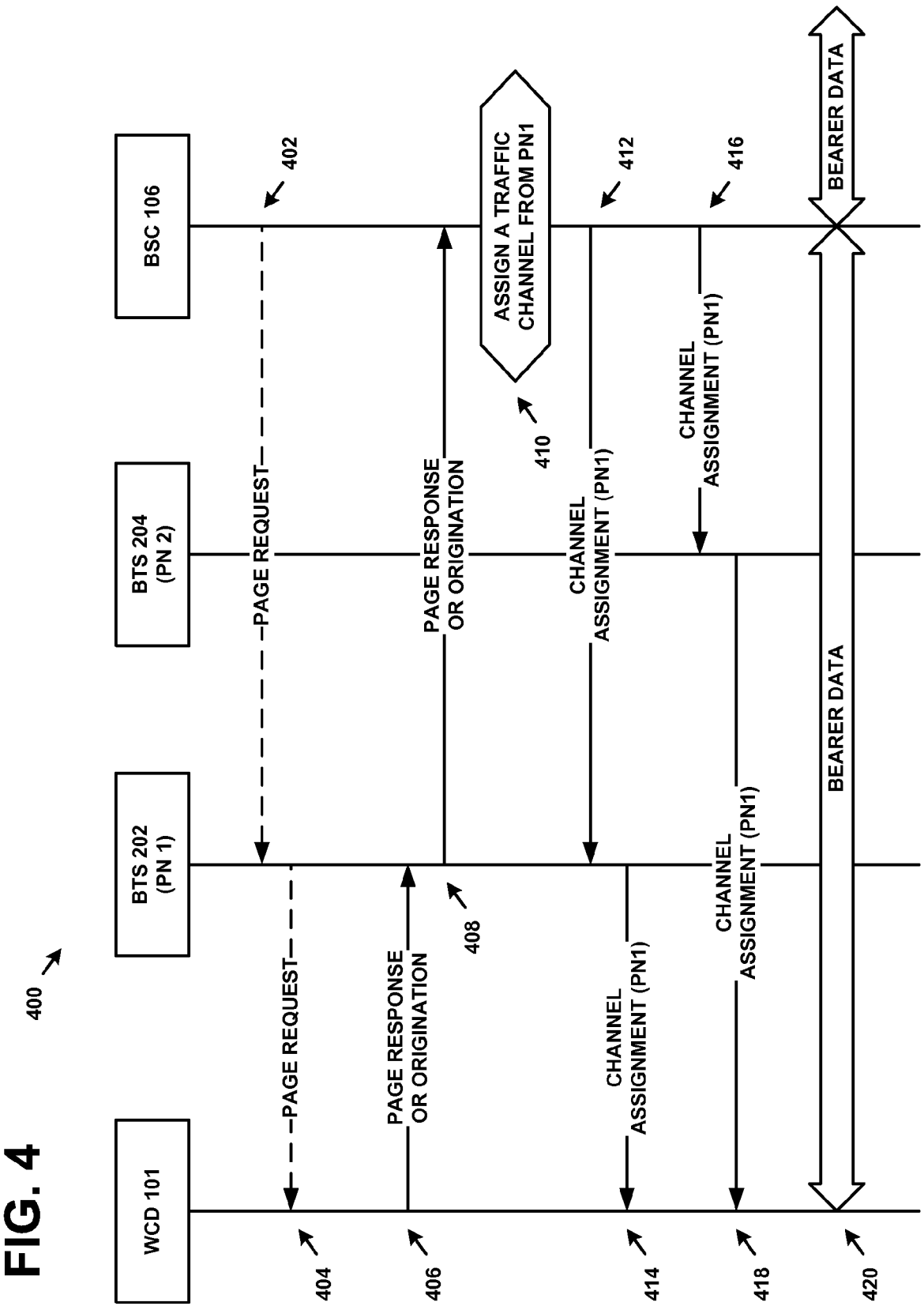
FIG. 4 is a first message flow, in accordance with an example embodiment.

For purposes of illustration, FIG. 4 shows an example message flow 400 of a RAN transmitting channel assignment messages via multiple wireless coverage areas during call establishment. FIG. 4 involves WCD 101, BTS 202, BTS 204, and BSC 106. BTS 202 defines a wireless coverage area with PN offset 1 ("PN 1"), and BTS 204 defines another wireless coverage area with PN offset 2 ("PN 2"). BTS 202 and BTS 204 are controlled by BSC 106. WCD 101 may be able to receive pilot channel signals of sufficient strength from both PN 1 and PN 2 such that WCD 101 could communicate effectively via either of these wireless coverage areas. Without loss of generality, it is assumed that PN 1 is the primary wireless coverage area of WCD 101.

WCD 101 may report, to BSC 106, measurements of the signal strengths at which WCD 101 receives the pilot channels of PN 1 and PN 2. This reporting may occur through the transmission of radio environment reports or pilot strength measurement messages (PSMMs), or via a different type of message.

Steps 402 and 404 illustrate BSC 106, via BTS 202, transmitting an optional page request message to WCD 101. Such a page request message may be transmitted when WCD 101 is paged to answer an incoming voice call or to receive incoming data. Steps 406 and 408 illustrate WCD 101 transmitting a message via BTS 202 to BSC 106. This message may be a page response message transmitted on the access channel in response to the optional page request message. Alternatively, this message may be an origination message, also transmitted on the access channel, with which WCD 101 attempts to establish an outgoing voice or data call. Additional alternative message types may also be used for this purpose, and any such message may be transmitted on the access channel or another type of channel.

Regardless of whether an incoming or outgoing call is being established for WCD 101, at step 410, BSC 106 may assign a traffic channel to WCD 101. In a possible scenario, BSC 106 may assign a traffic channel from PN 1. When making the traffic channel assignment, BSC 106 may consider pilot channel signal strength measurements that it received from WCD 101. BSC 106 may use these received signal strengths, and/or other information, when determining from which wireless coverage area to assign a traffic channel. Thus, if BSC 106 determines that WCD 101 receives the pilot signal from PN 1 at a lower strength than that of PN 2, BSC 106 may instead assign a traffic channel from PN 2 to WCD 101.

At steps 412 and 414, BSC 106 may transmit a first channel assignment message via BTS 202 to WCD 101. The first channel assignment message may include a traffic channel assignment for PN 1. In other words, the first channel assignment message may instruct WCD 101 to use a particular Walsh code to receive from PN 1. Similarly, at steps 416 and 418, BSC 106 may transmit a second channel assignment message via BTS 204 to WCD 101. The second channel assignment message may also include a traffic channel assignment for PN 1. By transmitting multiple channel assignment messages to WCD 101, the likelihood that WCD 101 receives at least one of these messages is increased. Regardless, at step 420, WCD 101 may begin receiving bearer traffic via BTS 202 (using PN 1).

While message flow 400 shows only two channel assignment messages being transmitted to WCD 101, more or fewer channel assignment messages may be transmitted to WCD 101 without departing from the scope of the invention. Further, throughout message flow 400, the names of these messages are used for purposes of convenience and messages with other names may be used for similar purposes.

d. Substantially Simultaneous Transmission of Bearer Data

As described in Section IIa, when the RAN substantially simultaneously communicates bearer data with a WCD via more than one wireless coverage area, the RAN and WCD may be able to engage in soft handoff procedures. Soft handoff may result in fewer dropped calls and a higher overall call quality, especially if the WCD is in motion.

Figure 5:
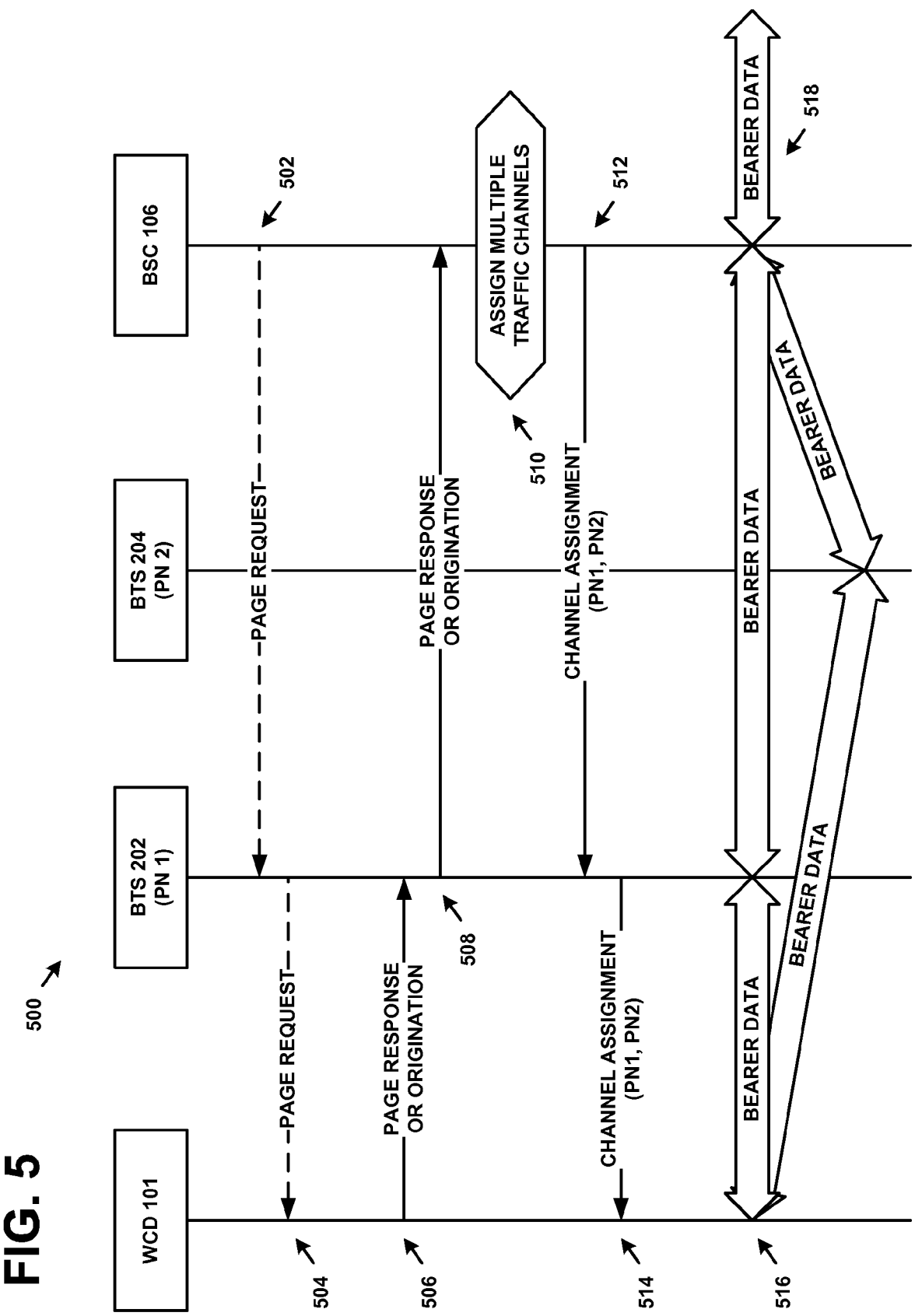
FIG. 5 is a second message flow, in accordance with an example embodiment.

Channel Assignment into Soft Handoff (CASHO) has been proposed as a way of assignment multiple traffic channels from different wireless coverage areas to a WCD during call establishment. Thus, using CASHO procedures may increase the reliability and quality of the initial portions of the calls. For purposes of illustration, FIG. 5 shows an example message flow 500 of a RAN and WCD engaging in CASHO procedures. Like FIG. 4, FIG. 5 involves WCD 101, BTS 202, BTS 204, and BSC 106.

Steps 502 and 504 illustrate BSC 106, via BTS 202, transmitting an optional page request message to WCD 101. Steps 506 and 508 illustrate WCD 101 transmitting a page response message or origination message via BTS 202 to BSC 106. At step 510, BSC 106 may assign multiple traffic channels to WCD 101. In particular, BSC 106 may assign one traffic channel from PN 1, and another traffic channel from PN 2, to WCD 101, in accordance with CASHO procedures. When making the traffic channel assignment, BSC 106 may consider pilot channel signal strength measurements that it received from WCD 101. BSC 106 may receive these signal strengths in radio environment reports or PSMMs, the page response or origination message of steps 506 and 508, or in some other type of message. In any case, BSC 106 may use these received signal strengths, and/or other information, when determining whether and/or how to perform CASHO procedures.

At steps 512 and 514, BSC 106 may transmit a channel assignment message via BTS 202 to WCD 101. The channel assignment message may include traffic channel assignments for both PN 1 and PN 2. In other words, the channel assignment message may instruct WCD 101 to use a particular Walsh code with PN 1 and another Walsh code with PN 2. Accordingly, at steps 516 and 518, WCD 101 may begin transmitting and receiving bearer data via both BTS 202 (using PN 1) and BTS 204 (using PN 2). Thus, via both BTS 202 and BTS 204, WCD 101 may receive forward direction bearer data streams from BSC 106, and may combine these streams into a single stream of bearer data. For example, WCD 101 may add the received signals from BTS 202 and BTS 204. Conversely, via both BTS 202 and BTS 204, BSC 106 may receive reverse direction bearer data streams from WCD 101, and may also combine these streams into a single stream of bearer data.

It should be understood that rather than traversing BTS 202, any of the page request messages, page response or origination messages, and/or channel assignment messages may instead traverse BTS 204, or both BTS 202 and BTS 204. Alternatively, BSC 106 may assign WCD 101 traffic channels from two different PNs defined by the same BTS. Further, the names of these messages are used for purposes of convenience and messages with other names may be used for similar purposes. Additionally, CASHO procedures may be performed such that more than two traffic channels are assigned to a WCD during call initiation.

III. Determining the Extent of Substantially Simultaneous Communication Based on a WCD's Likelihood of Roaming Transmitting channel assignment messages via multiple wireless coverage areas generally improves the success rates of call establishment, and CASHO generally improves call quality during the initial portion of a call. The more wireless coverage areas used for substantially simultaneous communication during channel assignment and/or CASHO procedures, the greater the potential benefit to the WCD.

However, as noted above, a possible downside of a WCD and a RAN engaging in this substantially simultaneous communication is that the communication requires use of more wireless air interface resources than non-simultaneous communication. For example, when the RAN substantially simultaneously transmits multiple channel assignment messages to the WCD, each via a different wireless coverage area, control channel resources of each of these wireless coverage areas are used. For CASHO, when the RAN substantially simultaneously transmits copies of the same bearer data to the WCD, each copy via a traffic channel from a different wireless coverage area, traffic channel resources in each of these wireless coverage areas are used. Thus, excessive use of substantially simultaneous communication may have a deleterious impact on the resource utilization of the RAN. Therefore, it behooves the RAN to be able to determine when a WCD is unlikely to benefit from substantially simultaneous communication, and in response to this determination, reduce the degree of substantially simultaneous communication between the RAN and this WCD.

The RAN may base this degree of substantially simultaneous communication on the WCD's likelihood of roaming. If, in the past, a WCD has exhibited a tendency to begin roaming to an adjacent non-preferred wireless coverage area while served by a preferred wireless coverage area, then it may be likely that the WCD will do so again. For instance, suppose that a WCD has been served by a given preferred wireless coverage area ten times in the last week. If, out of these ten occasions, the WCD roamed from the given preferred wireless coverage area to a non-preferred wireless coverage area five times and to another non-preferred wireless coverage area two times, then the WCD has demonstrated a tendency to roam. In this case, 70% of the time that the WCD was served by given preferred wireless coverage area, the WCD began roaming to a wireless coverage area of a roaming partner.

There are several possible reasons for why a WCD could exhibit this behavior. One reason may be that the WCD may have hardware, software, or mechanical characteristics that make it difficult for the WCD to transmit or receive properly on the frequency or frequencies used by the given preferred wireless coverage area or on the frequency or frequencies used by the home wireless service provider. For example, the WCD might be a relatively old model with a transceiver that has deteriorated over time. Even if the WCD is not able to transmit or receive properly via the given preferred wireless coverage area, the WCD may be able to transmit and receive properly on other preferred or non-preferred wireless coverage areas. For instance, the WCD may be able to communicate with fewer problems when using the frequencies of a non-preferred wireless coverage area. In other words, communication problems that the WCD experiences in the given preferred wireless coverage area may or may not occur in other wireless coverage areas.

Another possible reason for the WCD roaming to a non-preferred wireless coverage area with some frequency could be the physical location in which the WCD is typically used. For instance, a user of the WCD may live, work, or spend a substantial amount of time near a border of the given preferred wireless coverage area. Due to this physical proximity to the border, the signal strength of the given preferred wireless coverage area received by the WCD may be poor. Alternatively, the user of the WCD may spend a substantial amount of time in a physical location within the bounds of the given preferred wireless coverage area, but still receive a poor signal strength from this wireless coverage area. For example, this location could be a basement or the center of a large structure. As another example, the user of the WCD may simply be a highly mobile user, or may be highly mobile in a particular region. Under such conditions, the WCD may frequently roam to a non-preferred wireless coverage area.

Further, the location and/or arrangement of a preferred wireless coverage area may result in WCDs served by that wireless coverage area being likely to roam. For instance, if the preferred wireless coverage area covers mostly structures made from signal-reflecting materials (e.g., metal) and/or signal-attenuating materials (e.g., brick or cement), virtually any WCD served by the preferred wireless coverage area and within one of those structures could be likely to roam due to the difficulty of properly receiving signals while in the preferred wireless coverage area.

Thus, there are at least three scenarios in which a WCD may be likely to roam from a preferred wireless coverage area to a non-preferred wireless coverage area. The first is that the WCD itself is prone to roaming, regardless of the preferred wireless coverage area in which it is served. The second is that the WCD may be prone to roaming when served by specific preferred wireless coverage areas. The third is that the WCD may be prone to roaming when served by specific preferred wireless coverage areas because the specific wireless coverage areas cover locations that make it likely for most WCDs served by the specific wireless coverage areas to roam.

In any of these example scenarios, or other scenarios, the historical roaming data of a WCD may indicate that the WCD is likely to roam from a preferred wireless coverage area to a non-preferred wireless coverage area again in the future. In order to avoid this sort of roaming in at least some situations, a RAN may contain logic that (i) determines that a given WCD is likely to begin roaming to a non-preferred wireless coverage area, and (ii) in response to making this determination, takes steps to reduce the likelihood that the WCD begins roaming.

a. Detecting that a WCD is Likely to Begin Roaming to a Non-Preferred Wireless Coverage Area In order to detect that a WCD is likely to begin roaming, a RAN may collect data regarding when the WCD engages in a handoff. To that end, there may be multiple ways through which the RAN can learn that a WCD has been handed off. For instance, during the handoff process, the WCD may inform the RAN of the non-preferred wireless coverage area to which the WCD is being handed off. Alternatively, the RAN may receive, from the roaming partner that controls the non-preferred wireless coverage area, signaling messages indicating that the WCD has been handed off to the non-preferred wireless coverage area.

However, if the RAN does not receive an explicit indication that the WCD was handed off, the RAN may infer that a handoff occurred. For example, the WCD may be taking part in a call via the preferred wireless coverage area. The RAN may receive an indication that a call leg between the RAN and the WCD was terminated, and may record the time of the termination, as well as the caller, callee, an identifier of the preferred wireless coverage area, and related information. (It should be understood that a call leg is segment of a call between two endpoints. Thus, when the WCD is handed off from a first BTS to a second BTS, the WCD may maintain the end-to-end call, but replace the call leg between the WCD and the first BTS with a call leg between the WCD and the second BTS.) At a later point in time (e.g., minutes, hours, or days after the call was terminated), the home wireless service provider may receive records of call legs and/or calls engaged in by the home wireless service provider's subscribed mobiles in roaming partners' wireless coverage areas. These records may take the form of call detail records (CDRs).

By correlating these received records with similar records recorded by the RAN, the home wireless service provider may be able to determine whether a WCD that took part in a call via the preferred wireless coverage area was handed off to a non-preferred wireless coverage area and took part in another call via the non-preferred wireless coverage area. For instance, the RAN may compare the caller and callee of a terminated call leg that took place in the preferred wireless coverage area to the caller and callee of call leg that subsequently took place in the non-preferred wireless coverage area. If the parties that took part in these calls are the same, this may indicate that the call was handed off from the preferred wireless coverage area to the non-preferred wireless coverage area, or that the call was dropped during the course of such a handoff, and then reestablished via the non-preferred wireless coverage area. Regardless, if the time between the call being terminated in the preferred wireless coverage area and a corresponding call being initiated in the non-preferred wireless coverage area is below a threshold value (e.g., a few seconds or few tens of seconds), the RAN may consider these events to be a "handoff."

The communication of CDRs from the roaming partner to the home service provider may be direct or may take place via a third party billing aggregator. The records may be formatted according to Transferred Account Procedure (TAP) or Cellular Intercarrier Billing Exchange Roamer (CIBER). Such records may comprise call detail records for each call or call leg made by a roaming WCD, including the WCD's location, the calling party, the called party, the time of the call, and the duration of the call.

Regardless of how the RAN, or some other entity, collects roaming data, the RAN may store or have access to the roaming data in the form of a table or similar structure. For instance, roaming data indicating a particular WCD's likelihood of roaming, regardless of the preferred wireless coverage area that serves the particular WCD, may be stored in a table. In order to determine the particular WCD's likelihood of roaming, the RAN would look up the WCD in the table.

Figure 6:
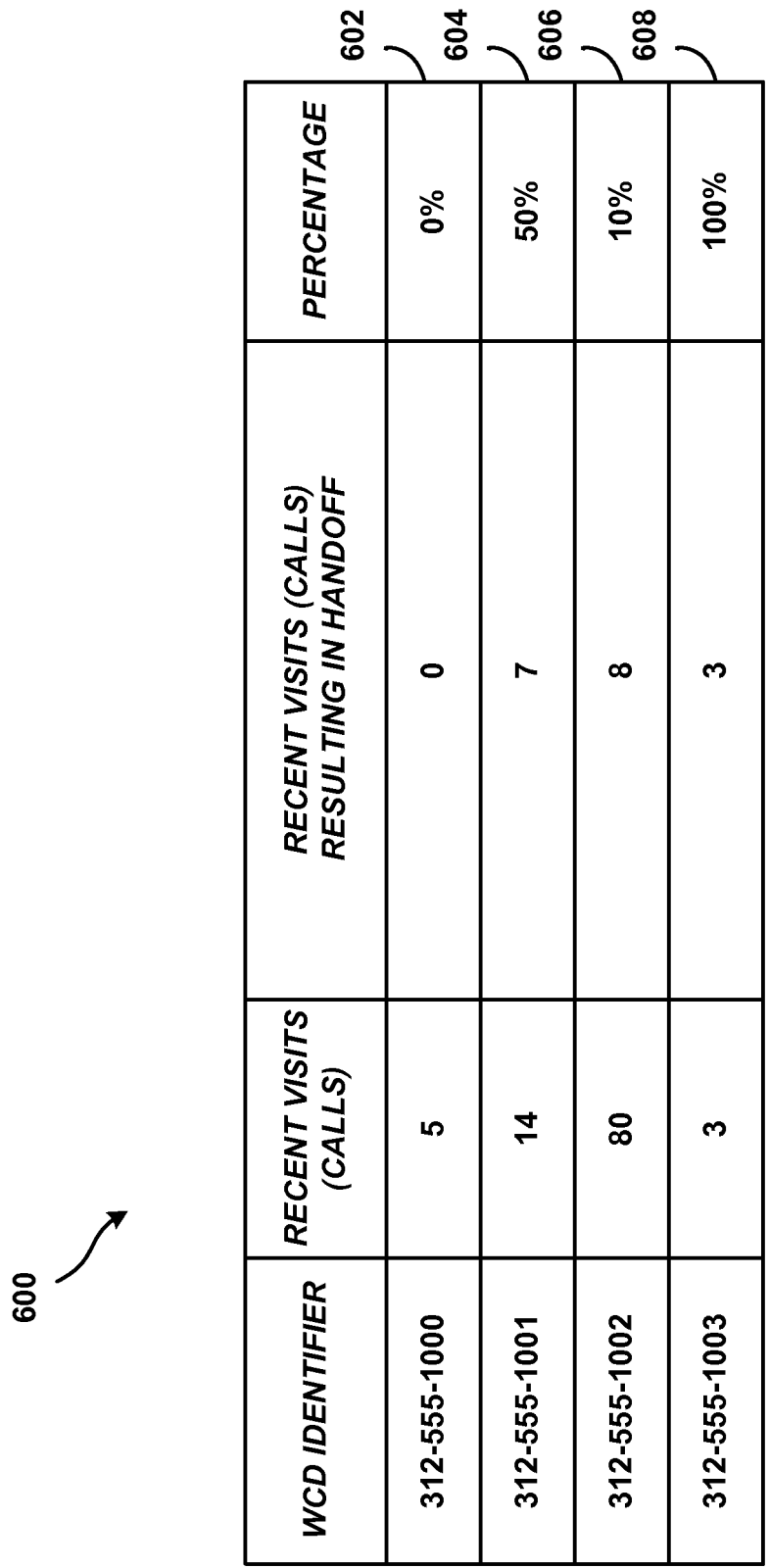
FIG. 6 is a table of historical roaming data, in accordance with an example embodiment.

In order to efficiently use historical roaming data that reflects a particular WCD's likelihood of roaming when served by a particular preferred wireless coverage area, the RAN may have access to information such as that in FIG. 6. Table 600 in FIG. 6 contains entries 602, 604, 606, and 608 of example data that could assist a RAN in performing this task. For each entry, table 600 stores a WCD identifier, a number of recent visits/calls, another number of recent visits/calls resulting in a handoff to a non-preferred wireless coverage area, and a percentage.

A table like table 600 may be maintained for each preferred wireless coverage area. Further, a database storing data such as that of table 600 may be maintained by a service provider, or by a third party entity. Thus, the data may be maintained at an existing RAN component, at a standalone RAN component, or at a separate component to which the RAN has access. The information in table 600 may be presented or stored in other ways as well. As an alternative, the RAN may not have direct access to such a table, and may instead retrieve historical roaming data on an as-needed basis.

With respect to the contents of table 600, a WCD identifier may be a string of characters or bits that can be used to identify a WCD. As noted above, examples of WCD identifiers include NAIs, MDNs, MINs, IMSIs, ESNs, and MEIDs. Any of these types of WCD identifiers, or other data that can be used to identify WCDs, may be used in the "WCD identifier" column of table 600. For purposes of simplicity, entries 602, 604, 606, and 608 contain MDNs (phone numbers) as WCD identifiers, but other types of WCD identifiers may be used instead.

An entry in the "recent visits (calls)" column may be a count of recent visits that the WCD made to the preferred wireless coverage area. Such a visit may entail a WCD registering for service with the preferred wireless coverage area, but not necessarily making any calls in the preferred wireless coverage area (e.g., the WCD remains idle while served by the preferred wireless coverage area). On the other hand, an entry in the recent visits/calls column may be a count of recent calls that the WCD made using resources of the preferred wireless coverage area. Such a call might be a voice call, a data call, or some other type of communication.

An entry in the "recent visits (calls) resulting in handoff" column may be a count of recent visits that the WCD made to the preferred wireless coverage area wherein, during or after these visits, the WCD was handed off to a non-preferred wireless coverage area. Alternatively, an entry in this column may be count of recent calls that the WCD made, using the resources of the preferred wireless coverage area, in which the WCD was handed off to a non-preferred wireless coverage area. This column may measure the same types of event (i.e., calls or visits) that the "recent calls (visits)" column measures.

Regardless of how calls or visits are measured, the "recent visits (calls) resulting in handoff" column may be used to determine how frequently in the past that the WCD with the specified WCD identifier either registered for service with the preferred wireless coverage area and was handed off, or used resources of the preferred wireless coverage area and was handed off. If either event or both events occurs frequently, this may indicate that the WCD is likely to be handed off from the preferred wireless coverage area to a non-preferred wireless coverage area.

For example, a WCD may register for service in the preferred wireless coverage area. Whether or not the WCD actually uses any bearer resources of the preferred wireless coverage area, the RAN may record the time of this registration. Accordingly, the RAN may increment the WCD's entry in the "recent visits (calls)" column of table 600. Then, the RAN may determine that the WCD has been handed off to a non-preferred wireless coverage area, and may record the time of the handoff. If the time between these two recorded events is less than a threshold duration (e.g., a few seconds to a few minutes), the RAN may deem the WCD to have been handed off to a non-preferred wireless coverage area. Therefore, the RAN may increment the WCD's entry in the "recent visits (calls) resulting in handoff" column.

An entry in the "percentage" column of table 600 indicates, for the WCD with the specified WCD identifier, the percentage of recent visits (calls) that were handed off to a non-preferred, wireless coverage area. These entries may result from dividing the WCD's entry in the "recent visits (calls) resulting in handoff" by the WCD's entry in the "recent visits (calls)" column.

For instance, in record 602 for WCD identifier 312-555-1000, out of 5 recent visits (calls), none resulted in such a handoff. Thus, the entry in the "percentage" column is 0%, indicating that the WCD with this identifier is unlikely to be handed off to a non-preferred wireless coverage area in the future. Similarly, in record 606 for WCD identifier 312-555-1002, the entry in the "percentage" column is 10%, also indicating that the WCD with this identifier is unlikely to be handed off to a non-preferred wireless coverage area in the future. On the other hand, the entries in the "percentage" column for records 604 and 608 are 50% and 100%, respectively. Thus, the WCDs with the identifiers 312-555-1001 and 312-555-1003 are likely to be handed off to a non-preferred wireless coverage area again in the future.

In practice, because of the volume of WCDs that typically subscribe to a given service provider, the size of a table containing roaming data may be quite large. Accordingly, in a further aspect, a RAN component, such as an RNC, may pre-load or cache roaming data for WCDs registered in its coverage area. For example, when a WCD registers with the RAN in a coverage area served by a given RNC, the RNC may look up the roaming data for the WCD in that coverage area. The RNC may then store the roaming data for the WCD in local data storage (i.e., data storage located at the RNC) so that the roaming data is readily available in the event that the RNC needs to page the WCD.

While the likelihood of roaming for a given WCD may be based on that WCD's roaming data for the preferred wireless coverage area in which the WCD is located, it also possible that the likelihood of roaming may be calculated based upon historical roaming data for some or all WCDs that have been served by the preferred wireless coverage area. In such an embodiment, the likelihood of roaming for a given WCD may simply be the overall roaming-likelihood indicator for the preferred wireless coverage area in which the WCD is registered. Thus, the overall roaming-likelihood indicator reflects the tendency of any WCD served by the preferred wireless coverage area to roam. Since the overall roaming-likelihood indicator does not indicate roaming tendency on a per-WCD basis, the overall roaming-likelihood indicator for a given WCD registered in a given coverage area may be the same as for all other WCDs registered in the coverage area.

It should be understood that table 600 contains examples of the type of information that a home wireless service provider might use to determine whether a WCD is likely to roam. Thus, table 600 may include more or fewer columns or rows, each containing potentially different information than is shown in table 600. For instance, contents of the "percentage" column could be integer values or non-integer values, or could signify a percentage using other types of representations.

Moreover, in addition to the ways of detecting that a WCD is likely to begin roaming discussed above, there may be other ways of performing such detection that are in accordance with the embodiments herein.

b. Increasing the Extent of Substantially Simultaneous Communication

In response to determining that a WCD is likely to begin roaming, the RAN may increase the extent of substantially simultaneous communication between the WCD and the RAN. Thus, if the WCD and RAN are communicating substantially simultaneously via a set of wireless coverage areas, the RAN may increase the number of wireless coverage areas in the set. If the WCD and RAN are communicating via just a given wireless coverage area, the RAN may instruct the WCD to begin communicating substantially simultaneously with the RAN via the given wireless coverage area and one or more additional wireless coverage areas. The form of substantially simultaneous communication may include either the RAN or the WCD substantially simultaneously transmitting signaling messages (e.g., channel assignment messages) or bearer data via these wireless coverage areas.

TABLE 1

A mapping of likelihood of a WCD roaming to the number of wireless coverage areas with which to communicate with WCD.

| Likelihood of the WCD Roaming (x) | Number of Wireless Coverage Areas with which to Communicate with the WCD |
|---|---|
| $0\% \le x < 30\%$ | 1 |
| $30\% \le x < 60\%$ | 2 |
| $60\% \le x < 70\%$ | 3 |
| $70\% \le x < 80\%$ | 4 |
| $80\% \le x < 90\%$ | 5 |
| $90\% \le x < 100\%$ | 6 |

Table 1 shows an example of how the extent of substantially simultaneous communication between the WCD and the RAN can be based on the WCD's likelihood of roaming. In Table 1, the WCD's likelihood of roaming is expressed as a percentage between 0% and 100%, inclusive. This percentage may be based on the WCD's historical roaming data (e.g., data such as that of FIG. 6) and/or derived from other information. As the likelihood of the WCD roaming increases, so does the number of wireless coverage areas that RAN uses for substantially simultaneous communication with the WCD. Thus, for instance, if the WCD's likelihood of roaming is 35%, the RAN may use two wireless coverage areas for the communication. However, if the WCD's likelihood of roaming is 87%, the RAN may use five wireless coverage areas for the communication. Thus, in response to determining the WCD's likelihood of roaming, the RAN may reference a table such as Table 1 to determine the number of wireless coverage areas with which to use for substantially simultaneous communication with the WCD.

Figure 7:
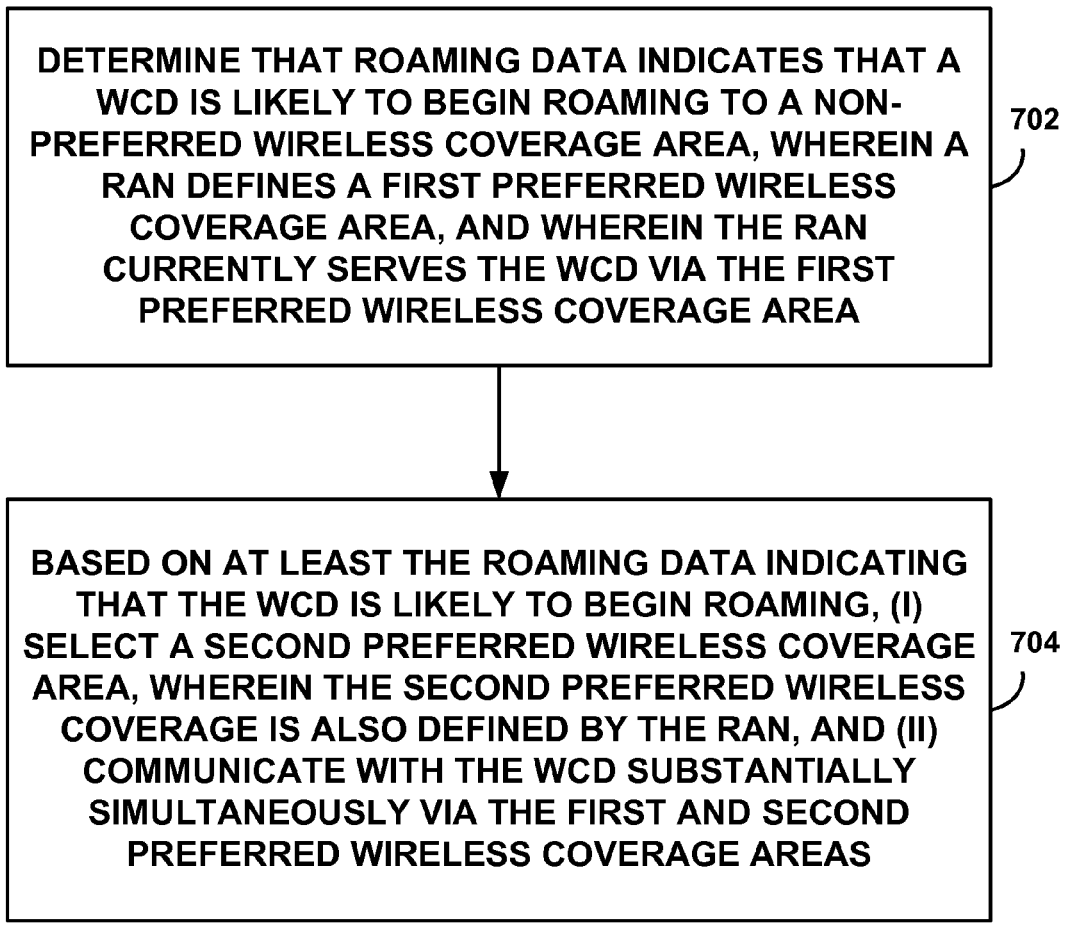
FIG. 7 is a first flow chart, in accordance with an example embodiment.
Figure 8:
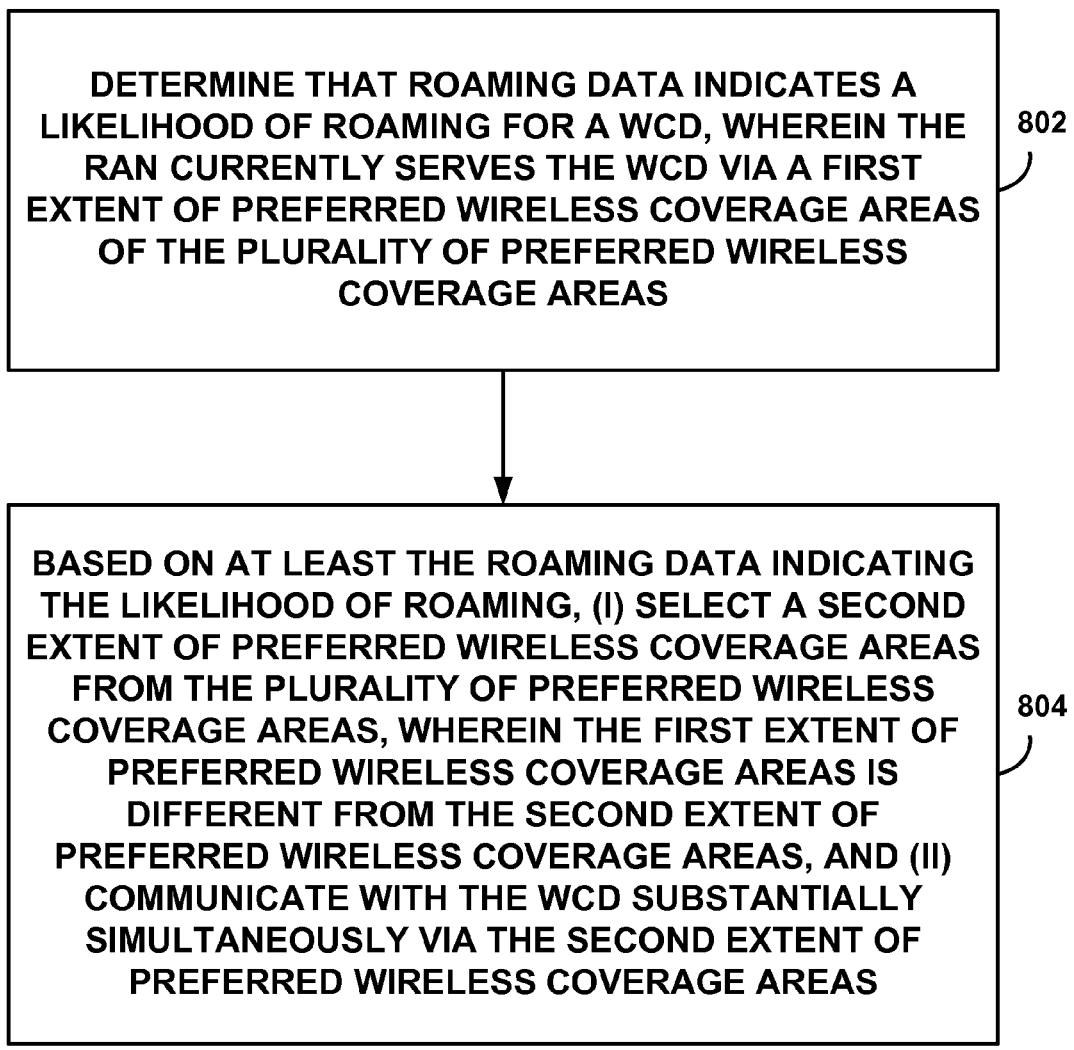
FIG. 8 is a second flow chart, in accordance with an example embodiment.

FIGS. 7 and 8 provide further example embodiments through which a RAN may communicate substantially simultaneously with a WCD based on the WCD's likelihood of roaming. At step 702 of FIG. 7, a RAN that defines a first preferred wireless coverage area may determine that roaming data indicates that a WCD served via the first preferred wireless coverage area is likely to begin roaming to a non-preferred wireless coverage area. At step 704, based on at least the roaming data indicating that the WCD is likely to begin roaming, the RAN may (i) select a second preferred wireless coverage area also defined by the RAN, and (ii) communicate with the WCD substantially simultaneously via the first and second preferred wireless coverage areas.

Determining that the roaming data indicates that the WCD is likely to begin roaming may involve determining that the WCD is likely to be handed off from the first preferred wireless coverage area to the non-preferred wireless coverage area. However, other ways of determining that a WCD is likely to begin roaming may be used. For example, a WCD may be likely to begin roaming when a strength at which the WCD receives pilot signals from the first preferred wireless coverage area does not meet a threshold pilot signal strength (e.g., the pilot strength threshold may be −10 dB, −12 dB, −14 dB, or any other reasonable value), or when a signaling or bearer channel utilization of the first preferred wireless coverage area meets a channel utilization threshold (e.g., the channel utilization threshold may be 50%, 70%, 80%, 90%, or any other reasonable value). In the latter situation, a high channel utilization in the preferred wireless coverage area may indicate that the preferred wireless coverage area is less likely to be able to provide channel capacity to the WCD, and that the WCD is thus more likely to attempt to acquire channel capacity from a non-preferred wireless coverage area if attempts to communicate via the preferred wireless coverage area fail. Based on either or both of these events taking place, the RAN may determine that the WCD is likely to begin roaming.

Alternatively or additionally, the RAN may have access to a table that maps WCD identifiers to respective handoff data associated with each respective WCD identifier (e.g., the table of FIG. 6 or a similar table). Then, determining that the WCD is likely to be handed off from the first preferred wireless coverage area to the non-preferred wireless coverage area may involve (i) determining a given WCD identifier of the WCD, (ii) looking up the given WCD identifier in the table, and (iii) based on given respective handoff data that is stored in the table and associated with the given WCD identifier, determining that in the past the WCD has been handed off from the first preferred wireless coverage area to the non-preferred wireless coverage area. The given respective handoff data may include a percentage associated with the given WCD identifier. This percentage may represent how frequently the WCD has been handed off from the first preferred wireless coverage area to the non-preferred wireless coverage area. In this case, determining that, in the past, the WCD has been handed off from the first preferred wireless coverage area to the non-preferred wireless coverage area may involve the RAN determining that the percentage is greater than a threshold value (e.g., the threshold value may be 20%, 50%, 70%, or any other reasonable value).

In FIG. 7, communicating substantially simultaneously via the first and second preferred wireless coverage areas may involve the RAN transmitting a respective channel assignment message to the WCD via each of the first and second preferred wireless coverage areas. The transmission of these channel assignment messages may take place during establishment of a call in which the WCD participates.

Alternatively or additionally, communicating substantially simultaneously via the first and second preferred wireless coverage areas may involve the RAN assigning, to the WCD, a respective traffic channel from each of the first and second preferred wireless coverage areas. This assignment may occur prior to or during the establishment of a call. The substantially simultaneous communication may also involve, during an initial portion of the call, the RAN exchanging bearer traffic with the WCD via each of the assigned traffic channels. The RAN may transmit and receive identical copies of the same bearer traffic via each of the assigned traffic channels. Regardless of how the substantially simultaneous communication actually occurs, it may involve communications traversing each of the first and second preferred wireless coverage areas at approximately the same time.

Once the RAN and the WCD are communicating substantially simultaneously via the first and second wireless coverage areas, the RAN may determine that the WCD is no longer likely to begin roaming. For instance, the WCD may have moved to a different location such that the WCD is receiving strong signals from one or both of the first and second wireless coverage areas. In this case, the RAN may conserve network resources by reducing the extent of substantially simultaneous communication with the WCD. Accordingly, if the RAN determines that roaming data indicates that the WCD is no longer likely to begin roaming to the non-preferred wireless coverage area, then, based on at least the roaming data indicating that the WCD is no longer likely to begin roaming, the RAN may communicate with the WCD via exactly one of the first and second preferred wireless coverage areas.

In the flow chart depicted in FIG. 8, a RAN may define a plurality of preferred wireless coverage areas. The RAN may serve a WCD via a first extent of preferred wireless coverage areas of the plurality of preferred wireless coverage areas. At step 802, the RAN may determine that roaming data indicates a likelihood of roaming for a WCD. At step 804, based on at least the roaming data indicating the likelihood of roaming, the RAN may (i) select a second extent of preferred wireless coverage areas from the plurality of preferred wireless coverage areas, and (ii) communicate with the WCD substantially simultaneously via the second extent of preferred wireless coverage areas. In some embodiments, the first extent of preferred wireless coverage areas may be different from the second extent of preferred wireless coverage areas. For instance, if roaming data indicates that the WCD is likely to roam, the first extent of preferred wireless coverage areas may be a subset of the second of second extent of preferred wireless coverage areas. However, if the roaming data indicates that the WCD is unlikely to roam, the first extent of preferred wireless coverage areas may be a superset of the second of second extent of preferred wireless coverage areas.

It should be understood that FIGS. 7 and 8 depict non-limiting embodiments. Thus, more or fewer steps than shown in FIGS. 7 and 8 may be used without departing from the scope of the invention. Additionally, each of these steps may be repeated one or more times, or may be omitted altogether. Further, the flow charts of these figures may be combined with one another and/or with the mechanisms described in reference to Table 1, in whole or in part, also without departing from the scope of the invention. For instance, any of the additional features discussed in the context of FIG. 7 may also be applied to methods illustrated by the flow chart of FIG. 8.

IV. Conclusion

Example embodiments have been described above. Those skilled in the art will understand, however, that changes and modifications may be made to these embodiments without departing from the true scope and spirit of the invention, which is defined by the claims.

The invention claimed is:

1. A method comprising:
   a radio access network (RAN) determining that roaming data indicates that a wireless communication device (WCD) is likely to begin roaming to a non-preferred wireless coverage area, wherein the RAN defines a first preferred wireless coverage area, and wherein the RAN currently serves the WCD via the first preferred wireless coverage area; and
   based on at least the roaming data indicating that the WCD is likely to begin roaming, the RAN (i) selecting a second preferred wireless coverage area, wherein the second preferred wireless coverage is also defined by the RAN, and (ii) communicating with the WCD substantially simultaneously via the first and second preferred wireless coverage areas, wherein communicating substantially simultaneously via the first and second preferred wireless coverage areas comprises during establishment of a call in which the WCD participates, the RAN transmitting a respective channel assignment message to the WCD via each of the first and second preferred wireless coverage areas.

2. The method of claim 1, wherein determining that the roaming data indicates that the WCD is likely to begin roaming comprises:
determining that the WCD is likely to be handed off from the first preferred wireless coverage area to the non-preferred wireless coverage area.

3. The method of claim 2, wherein the RAN has access to a table that maps WCD identifiers to respective handoff data associated with each respective WCD identifier, and wherein determining that the WCD is likely to be handed off from the first preferred wireless coverage area to the non-preferred wireless coverage area comprises:
determining a given WCD identifier of the WCD;
looking up the determined given WCD identifier in the table; and
based on given respective handoff data that is stored in the table and associated with the given WCD identifier, determining that, in the past, the WCD has been handed off from the first preferred wireless coverage area to the non-preferred wireless coverage area.

4. The method of claim 3, wherein the given respective handoff data comprises a percentage, associated with the given WCD identifier, representing how frequently the WCD has been handed off from the first preferred wireless coverage area to the non-preferred wireless coverage area, and wherein determining that, in the past, the WCD has been handed off from the first preferred wireless coverage area to the non-preferred wireless coverage area comprises:
the RAN determining that the percentage is greater than a threshold value.

5. The method of claim 1, wherein determining that the WCD is likely to be handed off from the first preferred wireless coverage area to the non-preferred wireless coverage area comprises:
determining that a strength at which the WCD receives pilot signals from the first preferred wireless coverage area does not meet a threshold pilot signal strength.

6. The method of claim 1, wherein determining that the WCD is likely to be handed off from the first preferred wireless coverage area to the non-preferred wireless coverage area comprises:
determining that channel utilization of the first preferred wireless coverage area meets a channel utilization threshold.

7. The method of claim 1, wherein communicating substantially simultaneously via the first and second preferred wireless coverage areas further comprises:
during establishment of a call in which the WCD participates, the RAN assigning, to the WCD, a respective traffic channel from each of the first and second preferred wireless coverage areas; and
during an initial portion of the call, the RAN exchanging bearer traffic with the WCD via each of the assigned traffic channels.

8. The method of claim 7, wherein the RAN transmits and receives identical copies of the same bearer traffic via each of the assigned traffic channels.

9. The method of claim 1, wherein communicating substantially simultaneously via the first and second preferred wireless coverage areas further comprises:
the substantially simultaneous communications traversing each of the first and second preferred wireless coverage areas at approximately the same time.

10. The method of claim 1, further comprising:
the RAN determining that roaming data indicates that the WCD is no longer likely to begin roaming to the non-preferred wireless coverage area, wherein the RAN currently serves the WCD via the first and second preferred wireless coverage areas; and
based on at least the roaming data indicating that the WCD is no longer likely to begin roaming, the RAN communicating with the WCD via exactly one of the first and second preferred wireless coverage areas.

11. A method comprising:
a radio access network (RAN), that defines a plurality of preferred wireless coverage areas, determining that roaming data indicates a likelihood of roaming for a wireless communication device (WCD), wherein the RAN currently serves the WCD via a first extent of preferred wireless coverage areas of the plurality of preferred wireless coverage areas; and
based on at least the roaming data indicating the likelihood of roaming, the RAN (i) selecting a second extent of preferred wireless coverage areas from the plurality of preferred wireless coverage areas, wherein the first extent of preferred wireless coverage areas is different from the second extent of preferred wireless coverage areas, and (ii) communicating with the WCD substantially simultaneously via the second extent of preferred wireless coverage areas, wherein communicating substantially simultaneously via the second extent of preferred wireless coverage areas comprises (a) during establishment of a call in which the WCD participates, the RAN assigning, to the WCD, a respective traffic channel from each wireless coverage area in the second extent of preferred wireless coverage areas, and (b) during an initial portion of the call, the RAN exchanging bearer traffic with the WCD via each of the assigned traffic channels.

12. The method of claim 11, wherein communicating substantially simultaneously via the second extent of preferred wireless coverage areas further comprises:
during establishment of a call in which the WCD participates, the RAN transmitting a respective channel assignment message to the WCD via each wireless coverage area in the second extent of preferred wireless coverage areas.

13. The method of claim 11, wherein communicating substantially simultaneously via the second extent of preferred wireless coverage areas further comprises:
the substantially simultaneous communications traversing each wireless coverage area in the second extent of preferred wireless coverage areas at approximately the same time.

14. An article of manufacture including a non-transitory computer-readable medium, having stored thereon program instructions that, when executed by a radio access network (RAN), cause the RAN to perform operations comprising:
determining that roaming data indicates that a wireless communication device (WCD) is likely to begin roaming to a non-preferred wireless coverage area, wherein the RAN defines a first preferred wireless coverage area, and wherein the RAN currently serves the WCD via the first preferred wireless coverage area; and based on at least the roaming data indicating that the WCD is likely to begin roaming, (i) selecting a second preferred wireless coverage area, wherein the second preferred wireless coverage is also defined by the RAN, and (ii) communicating with the WCD substantially simultaneously via the first and second preferred wireless coverage areas, wherein communicating substantially simultaneously via the first and second preferred wireless coverage areas comprises during establishment of a call in which the WCD participates, the RAN transmitting a respective channel assignment message to the WCD via each of the first and second preferred wireless coverage areas.

15. The article of manufacture of claim 14, wherein determining that the roaming data indicates that the WCD is likely to begin roaming comprises:

determining that the WCD is likely to be handed off from the first preferred wireless coverage area to the non-preferred wireless coverage area.

16. The article of manufacture of claim 15, wherein the RAN has access to a table that maps WCD identifiers to respective handoff data associated with each respective WCD identifier, and wherein determining that the WCD is likely to be handed off from the first preferred wireless coverage area to the non-preferred wireless coverage area comprises:

determining a given WCD identifier of the WCD;

looking up the determined given WCD identifier in the table; and based on given respective handoff data that is stored in the table and associated with the given WCD identifier, determining that, in the past, the WCD has been handed off from the first preferred wireless coverage area to the non-preferred wireless coverage area.

17. The article of manufacture of claim 16, wherein the given respective handoff data comprises a percentage, associated with the given WCD identifier, representing how frequently the WCD has been handed off from the first preferred wireless coverage area to the non-preferred wireless coverage area, and wherein determining that, in the past, the WCD has been handed off from the first preferred wireless coverage area to the non-preferred wireless coverage area comprises:

the RAN determining that the percentage is greater than a threshold value.

18. The article of manufacture of claim 14, wherein communicating substantially simultaneously via the first and second preferred wireless coverage areas further comprises:

during establishment of a call in which the WCD participates, the RAN assigning, to the WCD, a respective traffic channel from each of the first and second preferred wireless coverage areas; and during an initial portion of the call, the RAN exchanging bearer traffic with the WCD via each of the assigned traffic channels.

19. The article of manufacture of claim 14, wherein communicating substantially simultaneously via the first and second preferred wireless coverage areas further comprises:

the substantially simultaneous communications traversing each of the first and second preferred wireless coverage areas at approximately the same time.

20. The article of manufacture of claim 14, wherein the computer-readable medium, also has stored thereon program instructions that, when executed by the RAN, cause the RAN to perform operations further comprising:

determining that roaming data indicates that the WCD is no longer likely to begin roaming to the non-preferred wireless coverage area, wherein the RAN currently serves the WCD via the first and second preferred wireless coverage areas; and based on at least the roaming data indicating that the WCD is no longer likely to begin roaming, communicating with the WCD via exactly one of the first and second preferred wireless coverage areas.

* * * * *